United States Patent

Ritz

[11] 3,715,272
[45] Feb. 6, 1973

[54] METHOD OF OPERATING A NUCLEAR REACTOR FACILITY WITH A STEAM COOLED FAST BREEDER REACTOR AS THE HEAT SOURCE

[75] Inventor: Ludolf Ritz, Karlsruhe-Waldstadt, Germany

[73] Assignee: Gesellschaft fur Kernforschung m.b.H., Karlsruhe, Germany

[22] Filed: April 16, 1970

[21] Appl. No.: 29,232

[30] Foreign Application Priority Data

April 16, 1969 Germany..................P 19 19 278.0

[52] U.S. Cl............................................176/60, 176/40
[51] Int. Cl................................................G21b 1/02
[58] Field of Search...........................176/60, 65, 40

[56] References Cited

UNITED STATES PATENTS

| | | | |
|---|---|---|---|
| 3,047,479 | 7/1962 | Young et al. | 176/60 X |
| 3,321,377 | 5/1967 | Schluderberg | 176/60 |
| 3,161,572 | 12/1964 | Kagi | 176/60 X |
| 3,153,618 | 10/1964 | Acklin | 176/60 X |
| 3,153,620 | 10/1964 | Profos | 176/65 X |

*Primary Examiner*—Reuben Epstein
*Attorney*—Spencer & Kaye

[57] ABSTRACT

A method of operating a nuclear reactor facility in which a primary and a secondary cooling cycle are coupled together by means of a heat exchanger, with the primary cooling cycle containing a steam cooled fast breeder reactor and the secondary cooling cycle containing a working unit operated on steam which is generated and superheated in the heat exchanger. A fraction of the steam is superheated in the reactor to complete condensation in the heat exchanger, and the thus produced condensate is mixed with the other fraction of the steam superheated in the reactor to produce live steam which is recycled into the reactor. The coolant for the primary cycle is either entirely or predominantly $D_2O$. The desuperheating and condensation of the primary coolant in the heat exchanger is performed at a pressure level slightly higher than that of the secondary coolant.

4 Claims, 1 Drawing Figure

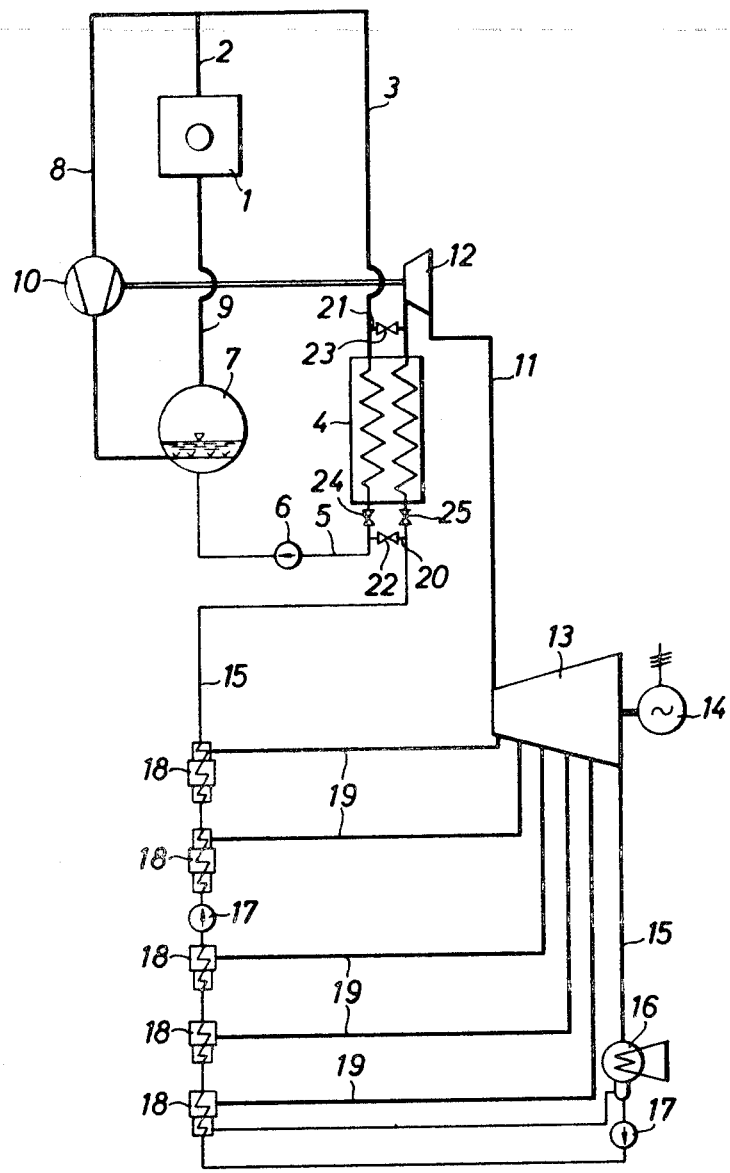

METHOD OF OPERATING A NUCLEAR REACTOR FACILITY WITH A STEAM COOLED FAST BREEDER REACTOR AS THE HEAT SOURCE

The invention relates to a method of operating a nuclear reactor facility comprising a primary and a secondary coolant cycle coupled by means of a heat exchanger, the primary cycle containing a steam cooled fast breeder reactor and the secondary cycle containing a working unit operated on steam the steam of which is generated and superheated in the heat exchanger.

In the conventional facilities of this type, which use steam cooled thermal reactors as the heat sources, the heat exchanger must be designed very big and thus has a considerable impact on the capital costs. This is due mainly to the reason that in the evaporation range of the secondary coolant the differential temperature between the primary and the secondary coolant decreases in the direction of flow of the primary coolant and condensation of the latter cannot be allowed to occur for reasons of reactor technology. An additional difficulty encountered with fast breeder reactors is the fact that the neutron spectrum becomes softer with increasing pressures. If the breeding ratio is to be as high as possible, this, too, will result in certain limits.

It is the object of the present invention to provide a method of operating a nuclear reactor facility of the type described above, which allows a reduction of the capital and operating costs and, in addition, can be easily controlled. Moreover, the method is to allow the use of simple design elements proven in reactor technology as well as in conventional power station engineering.

According to the invention, this problem is solved by causing a fraction of the steam superheated in the reactor to cool in the heat exchanger up to complete condensation and mixing the conden-sate produced in a well-known way with the other fraction of the steam superheated in the reactor to generate live steam which is recycled into the reactor, and by using $D_2O$ either wholly or pre-dominately as the coolant for the primary cycle.

According to the present invention, desuperheating and condensation in the heat exchanger occurs at a pressure level slightly higher than that of the secondary coolant. The generation of live steam is carried out best in at least one Loffler boiler. In addition to, or in lieu of this, other evaporators, e.g., spray evaporators, can be provided for as well, if required.

Condensation of the primary coolant in the heat exchanger produces a much higher heat transfer to the secondary coolant at the same differential temperature. The use of $D_2O$ in the primary cooling cycle permits the application of higher pressures, since $D_2O$ is a worse moderator than $H_2O$ and thus does not shift the neutron spectrum that much in the direction of lower energies. The result of both steps is that the primary cycle, which consists of very high grade components and normally must be shielded against radiation and contamination, respectively, especially the heat exchanger, can be made very compact. In this case, the pressures in the reactor can be at least of the same order as, e.g., those in comparable gas cooled fast breeder reactors without significant breeding losses and with much better heat transfer and higher attainable fuel pin power.

Compared to the familiar direct cycles, the invention offers the advantage that the relatively costly $D_2O$ inventory can be kept small and the required leakage monitoring devices can be re-stricted to a minimum. The separation between nuclear cycle (primary cycle) and working cycle (secondary cycle) does require a heat exchanger but, on the other hand, this leaves the working cycle easily accessible for maintenance and repair work allowing this work to be performed quickly and without any obstruction, e.g., contaminated plant components. Minimum maintenance and repair periods, respectively, are a major point in reaching a high load factor; this advantage becomes more significant the lower the investment required for the heat exchanger can be kept.

A reactor facility embodying the method according to the invention is explained in detail on the basis of the accompanying drawing in which the single figure is a schematic showing of the method.

The $D_2O$ steam superheated in the reactor 1 leaves through the line 2 and is split up into two partial streams. Some 30 percent of the steam flows through the branch line 3 into the heat exchanger 4. In the condensed form this partial stream leaves the heat exchanger through the line 5 and is fed into a Loffler boiler 7 by means of a condensate pump 6.

The second partial stream of superheated steam is fed to the Loffler boiler 7 through the line 8 by means of a blower 10 in order to evaporate the first partial stream pumped in through line 5. The live steam thus generated is recycled into the reactor 1 through the line 9 for superheating.

The superheated steam of the secondary cycle flows out of the heat exchanger 4 through the line 11 to an auxiliary turbine 12 driving the blower 10, and the working unit 13 to which a generator 14 is coupled. The working unit 13 is followed on the line 15 by a condenser 16, several feed water pumps 17 and preheating systems 18 which are connected with the turbine 13 by taps 19. After the last preheating stage the condensate is recycled to the heat exchanger 4 for evaporation and superheating.

This facility is very easy to control because a natural fixed point exists in the Loffler boiler in which saturation pressure and temperature prevail constantly, also during variations in operation, and with the aid of which a pressure balancing system can be actuated in the fuel elements. Moreover, the Loffler boiler also acts as a cleaning element eliminating corrosion products. The direct connection between the Loffler boiler 7 and the reactor 1 has the advantage that these stable conditions (saturation pressure and temperature) are maintained on the reactor inlet as well.

The invention can be employed advantageously in thermal reactors as well, $H_2O$ being another possible primary coolant. Moreover, it is possible to convert the dual cycle system as described above into a direct cycle flow by simple means, if necessary. For this purpose, connecting lines 20 and 21 between the primary and secondary cycles, which can be closed by means of the valves 22 and 23, can be installed at the inlet and outlet of the heat exchanger 4. If these valves 22 and 23 are opened and, at the same time, the valves 24 and 25 are closed, the plant is converted into a direct cycle by bypassing the heat exchanger 4 which, in this case, can be used as an emergency condenser.

I claim:

1. Method of operating a nuclear reactor facility comprising a primary and a secondary cooling cycle coupled together by means of a heat exchanger with the primary cooling cycle containing a steam cooled fast breeder reactor and the secondary cooling cycle containing a working unit operated on steam whose steam is generated and superheated in said heat exchanger, the method comprising the steps of cooling a fraction of the steam superheated in the reactor to complete condensation in said heat exchanger and mixing the condensate produced with the other fraction of the steam superheated in the reactor to produce live steam which is recycled into the reactor and using $D_2O$ as the coolant for the primary cycle either entirely or predominately, the desuperheating and condensation of the primary coolant in the heat exchanger being performed at a pressure level slightly higher than that of the secondary coolant.

2. Nuclear reactor facility for executing the method as claimed in claim 1, wherein a Loffler boiler is used as a mixer-evaporator for generating the live steam in the primary cycle.

3. Nuclear reactor facility as claimed in claim 2 wherein a blower installed between the reactor outlet and the inlet of the mixer-evaporator is used for circulating the steam in the primary cycle.

4. Nuclear reactor facility as claimed in claim 2 wherein closable connecting lines are provided for between the lines of the primary and secondary cycles at the inlet and outlet of the heat exchanger by means of which the two separate cycles can be converted into a direct cycle and vice versa.

* * * * *